United States Patent [19]

Meyer et al.

[11] Patent Number: 6,066,189

[45] Date of Patent: May 23, 2000

[54] ABRASIVE ARTICLE BONDED USING A HYBRID BOND

[75] Inventors: Gerald W. Meyer, Framingham; Mianxue Wu; Elinor B. Keil, both of Worcester, all of Mass.

[73] Assignee: Norton Company, Worcester, Mass.

[21] Appl. No.: 09/213,589

[22] Filed: Dec. 17, 1998

[51] Int. Cl.[7] .............................. B24D 3/02; B24D 17/00
[52] U.S. Cl. ................................. 51/298; 51/293; 51/309
[58] Field of Search ............................ 51/293, 298, 307, 51/308, 309; 106/286.2, 286.5, 286.7

[56] References Cited

U.S. PATENT DOCUMENTS

| | | | |
|---|---|---|---|
| 4,349,386 | 9/1982 | Davidovits | 106/286.2 |
| 4,472,199 | 9/1984 | Davidovits | 106/286.2 |
| 4,888,311 | 12/1989 | Davidovits | 106/286.2 |
| 5,622,535 | 4/1997 | Bradshaw | 51/298 |

*Primary Examiner*—Michael Marcheschi
*Attorney, Agent, or Firm*—David Bennett

[57] ABSTRACT

Bonded abrasive products comprising alumina-based abrasive grains and a geopolymer bond system are significantly improved by providing the grain with a vitreous coating before incorporation in the geopolymer bond.

8 Claims, 2 Drawing Sheets

Surface Traverse Test

OD CF Test

ABRASIVE ARTICLE BONDED USING A HYBRID BOND

BACKGROUND OF THE INVENTION

This invention relates to abrasive articles made using a hybrid bond material. In the context of this description, the term "abrasive article" is understood to refer to those articles more commonly described as coated abrasives and bonded abrasives.

Coated abrasives are distinguished by the use of a substrate material which is usually planar and the deposition thereon of abrasive grain bonded to the substrate by a bond material. Conventionally the bond, or a precursor thereof, is deposited on the substrate and the abrasive grain is deposited on the binder which is then cured to provide an adequate anchor for the grain. The first binder layer is referred to as the maker coat and a coat over the grain is referred to as the size coat. In an alternative configuration the abrasive grain is mixed with a binder or binder precursor and the mixture is deposited on the substrate before the binder or binder precursor is cured. The bond/abrasive layer can be deposited as a uniform layer or in a structured pattern which is either the result of the deposition process or a subsequent treatment before cure of the binder. In the latter situation the coated abrasive product is often referred to as a structured abrasive.

Bonded abrasives articles are characterized in that they comprises a three-dimensional structure in which abrasive grain is held in a matrix of a bond which is conventionally a metal, a vitreous material or an organic material. Metal bonds are generally reserved for superabrasives. Metal bonded abrasives are generally obtained in the form of thin layers of superabrasive grain brazed on to a metal wheel or surface. The present invention relates more directly to abrasive articles in which the structure is three-dimensional and the bond is a hybrid bond.

The "hybrid" bonds employed in the products according to the invention are bonds that do not fall comfortably into either vitreous or organic categories. Vitreous bonds, as the name implies are based on glassy materials that need to melt and flow to coat the abrasive grain and form bond posts linking adjacent grains before being allowed to cool to solidify and hold the structure together. Vitreous bonded materials are therefore formed at high temperatures and using protracted forming cycles. The product is however very rigid and effective particularly in precision grinding applications. Organic bonded materials are however formed at considerably lower temperatures and the bond is a polymeric material that can be shaped at relatively low temperatures and which can be caused to become rigid as a result of cross-linking. The polymer can be a thermosetting resin such as for example a phenol/formaldehyde, a urea/formaldehyde or an epoxy resin or it can be a radiation curable resin such as for example an acrylated urethane resin or acrylated epoxy resin or acrylated polyester resin or any one of the many variations on such chemical themes that produce a highly cross-linked rigid polymer upon exposure to visible light, UV light or electron beam radiation, with or without a catalyst activating or enhancing the transformation.

One useful category of hybrid polymeric materials is described in U.S. Pat. Nos. 4,349,386; 4,472,199; and 4,888,311. These describe a family of silicoaluminates, polysialates and/or (siloxo-sialate) polymers. Such polymers have the generic formula: $M_n[-(Si-O_2-)_z-Al-O_2-]_n \cdot w.H_2O$ in which M is sodium or potassium or a mixture thereof, z is 1–3; w has a value up to 7 and n is the degree of condensation. Such polymers are now generally recognized by the trivial name "geopolymers". They are conveniently made by addition of a caustic-hydrated aluminosilicate to an alkali metal silicate solution. A minor variation on this theme produces polymers known as "geosets". These are made by the addition of a caustic solution of an alkali metal silicate to a hydrated aluminum silicate. For the sake of simplicity, both types of product will hereinafter be referred to as "geopolymers".

The use of such geopolymers in the production of bonded abrasives is recognized in EP Application 0 485 966 which also teaches that these bonds can be modified by the addition of organic polymers.

Geopolymers are characterized as "hybrid bonds" because they are not like either vitreous or organic bonds though they have some characteristics of each. They have very significant advantages over conventional vitreous bonds in the production of bonded abrasives. Of primary importance is that they form at comparatively low temperatures, (like organic bonds), that are well below the temperature at which glass is molten, and have a uniform composition. By contrast vitreous bonds must be formed at molten glass temperatures and held at such temperatures while the glass flows so as to coat the abrasive grains and form bond posts. The geopolymers however form polymeric structures with much of the hardness and strength of vitreous bonds and in this they are unlike conventional organic bonds which are much less brittle and have greater modulus values than vitreous bonds.

The use of geopolymers is therefore a very attractive alternative to conventional vitreous bonds from the point of view of their comparatively low temperature of formation. As a result of the relatively low temperature processing, many advanced technologies such as the use of active fillers which are unavailable in vitreous bonded products, can be incorporated in the bond. Added to these advantages is the higher post processing thermal stability and use temperatures by comparison with organic bonded products. The bond materials are therefore truly "hybrid" in nature.

The low processing temperature also makes possible the moderation of some of the brittleness associated with vitreous bonds by the addition of organic polymers. There is therefore the possibility of tailoring the physical properties of a bond to the needs of the product to be made.

There is however a serious problem with use of geopolymers in the production of bonded abrasive products in which the abrasive is based on alumina. This is because the bonds are formed in strongly alkaline conditions and the surface of the alumina abrasive grit is attacked by the alkali. The result is a very significantly weakened bond between the abrasive and the bond material such that in actual grinding tests the performance is quite unimpressive.

It has now been found that geopolymers can be used with alumina-based abrasives and this discovery forms the basis for this invention. This discovery opens up the possibility of low cost vitreous-bonded abrasives wherein the properties of the bonded abrasive can be adjusted by modification of the bond and wherein the bond is highly reproducible and economical to produce and use.

DESCRIPTION OF THE INVENTION

The present invention provides a process for the production of a bonded abrasive which comprises providing alumina-based abrasive grains having at least a portion of the surface of such grains covered by a vitreous layer; mixing said glass-coated, alumina-based abrasive grains with a geopolymer and curing said geopolymer to form a bonded abrasive product.

The alumina-based abrasive can be a fused alumina or a ceramic (or sintered) alumina, optionally one formed by a sol-gel process. It can also be a co-fused alumina-zirconia or mixture of such grains with other alumina abrasive grains. The bond attack problem is exacerbated by smaller alumina crystal sizes and thus the greatest benefit is secured when the alumina-based abrasive grains are in fact made by a seeded sol-gel process such as is described in U.S. Pat. No. 4,623,364 amongst others since this generates alumina crystals which are submicron. Alumina crystal sizes of up to about 10 microns are generated by unseeded sol-gel processes especially where crystal growth during sintering is inhibited by the presence of rare earth metal oxides, yttria, magnesia, zirconia and silica and the like. The benefits conferred by the present invention are also quite apparent when used with such unseeded sol-gel aluminas. More generally the invention is also useful with all fused aluminas.

The vitreous layer can be deposited on the grain, for example, by treating the grain with fumed silica followed by a firing process. Alternatively the grain may be treated with a mixture of conventional glass components and then fired at a temperature sufficient to form the glass and allow the glass to flow and coat the grains. The mixture would then be broken up to provide the glass coated grains. This process could be accelerated and made more uniform by the use of a powdered glass frit in place of the glass components.

The most convenient way to employ the process of the present invention is however much more straightforward. During the production of conventional vitreous bonded abrasive products, a certain percentage of the products are found to be outside the prescribed specifications and must be scrapped. In addition, after an abrasive product such as a wheel has reached the end of its useful life, there is often a substantial volume of the product remaining. These scrap and remnant products, when crushed, yield abrasive grain at least partially coated with a vitreous layer which remains from the previously used vitreous bond. The surface area of the grains is often essentially 100% covered with glass except where the grain has been subjected to abrasion or where a bond post has broken away leaving a portion of the surface exposed. Where such reclaimed abrasive grains are alumina-based, these can very suitably provide the coated alumina-based abrasive grains that are used in the present invention.

Thus the present invention provides an opportunity to use scrap material that would otherwise have to be sent to landfill operations. The advantages of the present invention are therefore clear. It is adapted to the use of otherwise valueless materials and is more environmentally acceptable.

The advantages are however not merely economic. The invention also provides for the first time, an opportunity to take advantage of the processing flexibility in terms of low temperature and rapid curing and the potential for bond design to meet the requirements of the product to be made.

The preferred embodiment of the invention comprises abrasive grain with a coating of a vitreous (glass) bond from 0.5 to 5 microns, (and more preferably 1 to 3 micrometers), in thickness. Such a coating is thick enough to protect the grain from attack by the caustic high-alkali geopolymer bond and yet still thin enough not to change the grain functions during grinding. To realize coatings within the preferred range the grain/glass ratio may need to be different depending on the grain size, grain density and glass density. To illustrate this, fused or sintered alumina abrasive grain with 100 grit particle size, (about 180 micrometers), coated with a typical vitreous glass bond has a grain/glass ratio of 100:5 by volume if the coating thickness is about 1.5 microns and the surface of the grain is assumed to be 100% covered. The coating will be slightly higher if the coverage is less than 100%.

The amount of the vitreous coating deposited on the grain is preferably enough to cover at least 50% and more preferably at least 70% of the grain surface. However it is often difficult or at least inconvenient to measure the amount of the coating in this fashion and the amount is more conveniently expressed in terms of the weight percentage represented by the vitreous material. Thus the weight of the vitreous coating usually represents from 1 to 30% and preferably from 2 to 20% and most preferably from 2 to 10% of the total weight of the coated grain.

The chemical composition of the vitreous layer is preferably one that does not significantly react with alumina during the coating operation. Thus formulations comprising alumina, silica, alkaline earth metal oxides and boron oxide as well as other lesser amounts of other metal oxides are frequently useful. Preferred vitreous compositions comprise (by weight), >47% silica, <16% alumina, 0.05–2.5% potassium oxide, 7–11% sodium oxide, 2–10% lithium oxide and 9–16% boron oxide.

The preferred vitreous compositions, especially where the alumina-based abrasive grains comprise a sol-gel alumina, are the so-called "low-temperature bond" formulations which are understood to be formulations that melt and flow at temperatures below about 1000° C.

The geopolymer bond is in general similar to a vitreous bond in the sense that it is highly cross-linked, and therefore rigid and brittle. The pH of the typical geopolymer formulation, prior to mixing with the grain, is >14. However, unlike conventional vitreous bonds it can be cross-linked at temperatures that will not degrade thermoplastic modifier polymers. Thus with geopolymers it becomes possible to incorporate a thermoplastic modifier to impart a degree of flexibility and strength to the bond material and this is often a preferred feature of the present invention. Suitable reinforcing or modifying thermoplastic polymers include polyolefins, polybutadiene, polyvinyl chloride, poly (tetrafluoroethylene), polyimides and polyesters. The amount of such reinforcing and/or modifying thermoplastic polymer that can be incorporated in the bond can represent up to 30% and preferably up to 20% of the total bond weight.

The geopolymer bond system can also be modified by the use of filler materials. The fillers can be active fillers such as iron pyrites, sulfur or organic grinding aids provided these are stable at the bond formation temperatures, or inorganic fillers such as mineral particles or glass or ceramic spheres whose main purpose is to aid in generating the desired degree of porosity or structure in the finished bonded abrasive product. Fillers can be used in proportions, based on the formulation weight, of up to 20% and more preferably from 5 to 10% by weight.

DESCRIPTION OF PREFERRED EMBODIMENTS

Figure 1:
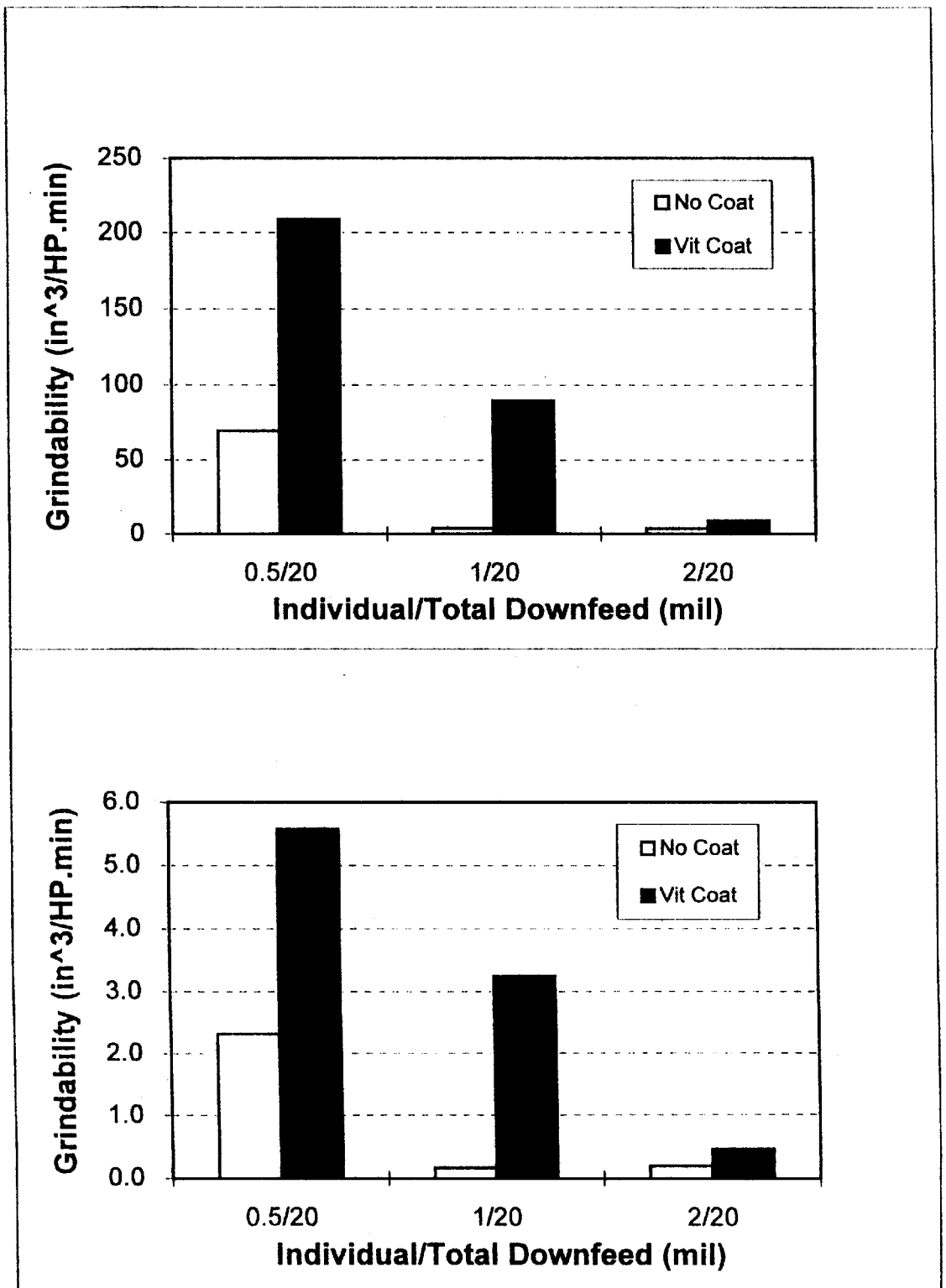
FIG. 1 presents bar graph representations of data from Example 1.

The invention is now described with specific reference to the following Examples which are understood to imply no essential limitation on the essential scope of the invention.

EXAMPLE 1

This Example describes the way of making hybrid-bond grinding wheels, with and without a coating of vitrified (glass) bond on the abrasive grain. It also compares the grinding performance between coated and uncoated grain containing wheels.

Two sets of bonded abrasive wheels were produced. The first set comprised a conventional fused alumina grain ("38 Alundum" alumina available from Saint-Gobain Industrial Ceramics, Inc. under that trade designation), in a geopolymer bond and the second set comprised the same abrasive grain provided with a vitreous coating and made into wheels using the same bond.

The abrasive grains in the second set were obtained by crushing a vitreous bonded abrasive wheel in which the vitreous bond had a formulation within the preferred formulation range specified above.

The vitreous material was present largely as a coating on the abrasive grains separated after crushing the wheel and represented about 3% of the total weight of the coated grain. By optical and electron scanning microscopy the coated grain appeared to have a glassy layer, smoother and shinier compared with the uncoated grain and covering at least 80–90% of the entire grain surface. Energy-dispersive spectroscopy within the SEM revealed the characteristic X-rays emitted from the layer which were characteristic of a silica-rich multicomponent structure. The chemical composition of the layer was found to be consistent with that of the glass that had been used to coat the grain.

In the formation of the wheels tested, the proportion of geopolymer bond to abrasive grain, was 25:75 by weight. In each case the geopolymer comprised the dry bond geopolymer, (GP600HT obtained from Geopolymere), potassium hydroxide, fumed silica and water. The dry bond material can be obtained by mixing metakaolin, sodium hexafluorosilicate and amorphous silica in the respective weight ratios 25:18:57.

The formulation used to make the wheels was as follows:

| MATERIAL | GRAMS |
| --- | --- |
| Fused alumina (100 grit) | 400 |
| GP600HT | 66 |
| Fumed Silica | 21.5 |
| KOH | 44.4 |
| Water | 48.2 |

Both sets of the wheels, (that is, whether or not containing the glass-coated abrasive grain), were prepared in the following manner.

Potassium hydroxide was dissolved in water and allowed to cool. Fumed silica was stirred into the potassium hydroxide solution producing potassium silicate solution which was allowed to cool before the GP600HT dry bond was stirred in. Finally the abrasive was blended into the mixture. If extra water was needed it was added at this point and blended into the mixture.

The mix was then poured and tamped into silicone rubber mold. The wheel mold used had the dimensions 13.65×1.27×3.18 cm. The filled mold was vibrated for about one minute. Excess mix was removed and the mold was covered by a PTFE sheet, a ceramic batt and then weighted with two steel plates each weighing about 4.5 kilograms.

The filled and weighted molds were allowed to sit for 2–4 hours at room temperature and then placed in an oven for the cure cycle "A" indicated in the following Table. Thereafter the wheels were removed from the molds and placed in a Lindberg furnace for the final cure cycle "B" in the Table.

| CURE CYCLE | CONDITIONS |
| --- | --- |
| A | Raise Temperature to 85° C. over one hour |
|   | 1.5 hours at 85° C. |
|   | Raise temperature to 120° C. over one hour |
|   | Maintain at 120° C. for 5 hours |
| B | Raise temperature to 350° C. over one hour |
|   | Maintain at 350° C. for 5 hours |

The finished wheels each had about 30–40% porosity and the final dimensions after the finishing process were 12.7×1.59×3.18 cm.

Both sets of wheels were then subjected to a surface traverse grinding test using a Brown & Sharpe machine, without the use of coolants. The wheel speed was maintained at about 4700 r.p.m. and the table speed was 15.2 m/minute. Before grinding, each wheel was dressed using a single point diamond at a speed to 25.4 cm/minute, with a dress compound of 0.025 mm. The metal ground was 52100 steel with a hardness of 65Rc in the form of a plate with a dimension of 40.6 cm in the direction of wheel grinding and 4.6 cm in the wheel cross-feeding direction. At the cross-feed rate of 1.27 mm, each wheel had a total down-feed of 0.5 mm with individual down-feed rates of 0.0125, 0.025 and 0.05 mm. The G-ratio, grinding power and metal removal rate (MRR) were measured at each individual down-feed rate for both sets of wheels to compare performances.

The results are presented in FIG. 1 in the form of two bar charts. The first compares the performance in terms of plots of G-Ratio measure at the different down-feed rates. The second compares the "Grindability", (defined as the G-Ratio divided by the Specific Energy which is itself defined as the specific power divided by the MRR), at the different down-feed rates.

From the data in FIG. 1 it is plain that in the surface traverse test, the wheel made with the coated grain very significantly outperformed the wheel made with the uncoated grain both in terms of the G-Ratio and Grindability.

EXAMPLE 2

In this Example the effect of the addition of filler materials to the bond system to modify the properties is investigated. The abrasive materials used and the molding and firing processes employed are as described in Example 1 with the further addition of fillers to produce two sets of wheels, both containing filler, but one set being made with glass-coated abrasive grain. The formulation from which the wheels were made was as set forth in Example 1 with the difference that a filler was used which comprised a mixture of 4 parts of fine inorganic dust with 1 part of bubbled mullite spheres available from Zeelan Industries under the trade name "Z-Light". The total amount of filler added was 39.6 grams. These wheels were evaluated by a cylindrical control force (ODCF) test. Compared with the test reported in Example 1, the wheel-work contact area was smaller such that the localized force on the abrasive grain was much more intense.

Figure 2:
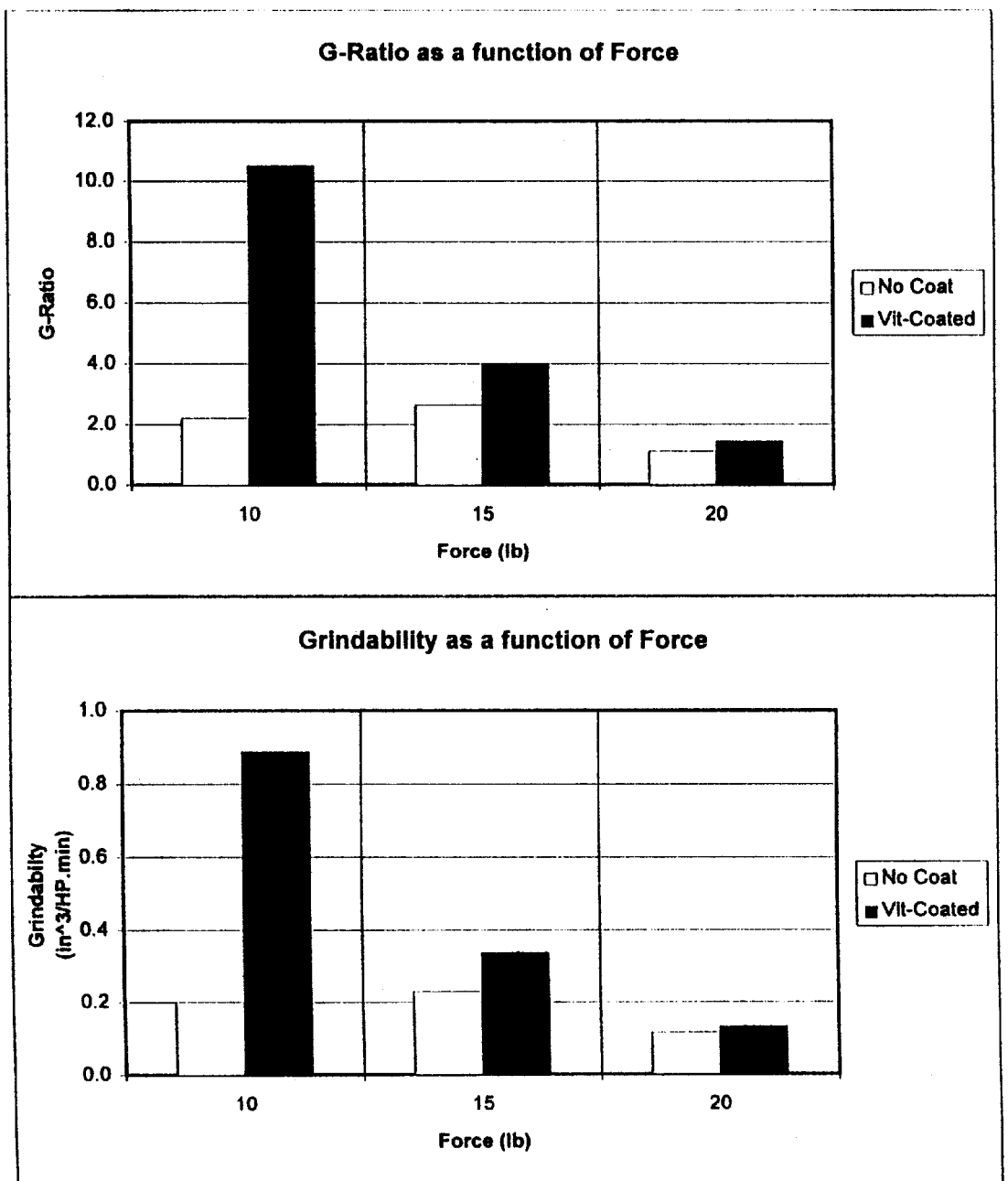
FIG. 2 presents bar graph representations of data from Example 2.

The ODCF test was conducted without coolants in a plunge grinding mode without a sparkout process. The metal ground was 52100 steel with a hardness of 59Rc. The cylindrical metal workpiece had a thickness of 6.4 mm and a diameter of 10.2 cm. The wheel speed was kept at about 4950 r.p.m. and the workpiece was rotated at 150 r.p.m. For each grinding period, the wheel was infed at a controlled constant force which began at 4.5 kg and increased 2.3 kg intervals until excessive wheel wear was obtained. The G-Ratio and Grindability were each plotted against grinding force. The results are presented in FIG. 2 of the Drawings in bar chart form and show the same pattern of improvement over the wheels made without abrasive grain lacking the glass coating. as is shown in FIG. 1. This indicates that the economic advantages afforded by the presence of filler materials are not accompanied in any deterioration in the physical advantages derived from the use of the coated abrasive grain.

The results obtained make it clear that, at low applied force and metal removal rates the wheels made with the coated abrasive grain performed very significantly better than the wheels made with the uncoated grain.

It is believed that, at the higher pressures the predominant failure mode is failure of the bond itself and this is reflected in the results. Thus where bond failure is not a factor, the coated grain used with the geopolymer bond produces a much better grinding wheel than does the uncoated grain.

What is claimed is:

1. A process for the production of a bonded abrasive which comprises providing alumina-based abrasive grains having at least a portion of the surface of such grains covered by a vitreous layer; mixing said coated, alumina-based abrasive grains with a geopolymer and curing said geopolymer to form a bonded abrasive product.

2. A process according to claim 1 in which the vitreous layer on the grain represents from 1 to 30% by weight of the grain weight.

3. A process according to claim 1 in which the vitreous layer on the grain covers at least 60% of the grain surface.

4. A process according to claim 1 in which the geopolymer is mixed with the abrasive grain in proportions such that, in the final abrasive product, the geopolymer represents from 10 to 50% of the weight of the product.

5. A process according to claim 1 in which the geopolymer has the formula: $M_n[-(Si-O_2-)_z-Al-O_2-]_n \cdot w.H_2O$ in which M is sodium or potassium or a mixture thereof, z is 1–3; w has a value up to 7 and n is the degree of condensation.

6. A process according to claim 1 in which the geopolymer is modified by incorporation of a thermoplastic polymer.

7. A process according to claim 6 in which the thermoplastic modifier is selected from the group consisting of polyolefins, polybutadiene, polyvinyl chloride poly(tetrafluoroethylene), polyimides, polyesters and mixtures thereof.

8. A process according to claim 1 in which the formulation also includes up to 10% by weight of finely divided filler material.

* * * * *